(No Model.)
T. A. HILL.
CHANGING GEAR FOR GRAIN DRILL HEADS.
No. 529,266. Patented Nov. 13, 1894.
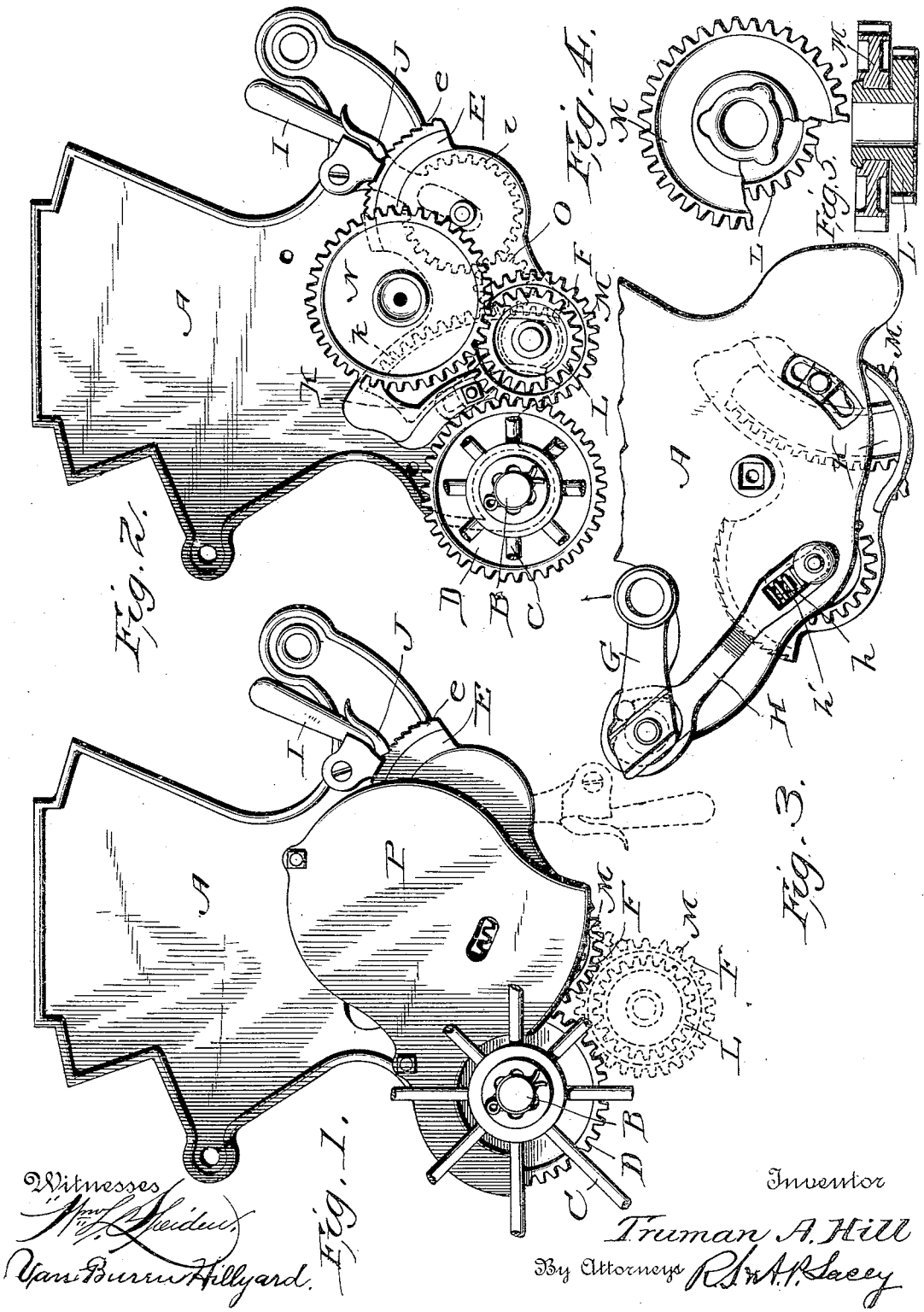
Witnesses
Inventor
Truman A. Hill
By Attorneys

UNITED STATES PATENT OFFICE.

TRUMAN A. HILL, OF MOUNT MORRIS, NEW YORK.

CHANGING-GEAR FOR GRAIN-DRILL HEADS.

SPECIFICATION forming part of Letters Patent No. 529,266, dated November 13, 1894.

Application filed September 4, 1893. Serial No. 484,784. (No model.)

*To all whom it may concern:*

Be it known that I, TRUMAN A. HILL, a citizen of the United States, residing at Mount Morris, in the county of Livingston, State of New York, have invented certain new and useful Improvements in Changing-Gear for Grain-Drill Heads; and I do hereby declare the following to be a full, clear, and exact description of the invention, such as will enable others skilled in the art to which it appertains to make and use the same.

This invention relates to improvements in grain and fertilizer drills, and especially to the means whereby the gearing is changed to regulate the feed of the said grain, &c.

The object of the invention is to provide a simple mechanism which will be housed to prevent gumming and the lodgment of foreign matter in the gearing, and which will readily permit of the gearing being changed without the necessity of removing the said housing.

The improvement consists of the novel features and the peculiar construction and combination of the parts which will be hereinafter more fully described and claimed and which are shown in the annexed drawings, in which—

Figure 1 is an end view of a fertilizer or grain drill box or hopper embodying the invention. Fig. 2 is a view similar to Fig. 1, the housing being removed. Fig. 3 is a detail view from the opposite end of Fig. 2 showing the yielding connection between the toothed lever and its support to prevent the breaking of the teeth should the latter come together when bringing the parts into operative relation after changing the gearing. Fig. 4 is a detail view of the pinion L and gear M. Fig. 5 is a sectional view of the pinion L, and gear M.

The end A of the hopper is a cast metal plate and forms a support for the operating gearing and is provided with a spindle B upon which is mounted the wheel C having a gear wheel D attached to or forming part of the hub. A hanger E is attached to the end A in such a manner as to have a limited movement to move the lower end approximately in the arc of a circle to bring the gear wheel F in and out of mesh with the gear wheel D, a lever G being provided for the purpose and mounted on an arm or extension of the hopper end A. A second lever H is slotted at its upper end to receive the hub portion of the lever G and its lower end is slotted to receive the bolt and tubular extension by means of which the hanger E is attached to the end A. A spring $h$ is interposed between the tubular extension of the hanger E and the inner closed end of the lever H, the latter having a projection $h'$ to enter the spring $h$ and retain the same in place. A lever I having a toothed head $i$ is mounted on the tubular extension of the hanger E and is provided with a spring operated pawl J which is adapted to engage with a ratchet end or portion $e$ of the hanger E to hold the said lever I in the required position. A curved casting K is provided on one edge with a series of teeth $k$ and has a stud at its lower end to form a bearing for a pinion L, and has an elevated rim portion to receive and form a bearing for a projecting hub portion of a gear wheel M through which the hub of the pinion L extends and interlock so that the pinion L and the wheel M will revolve together as one wheel. The gear wheel M is adapted to mesh with the gear wheel D and may be changed at will for a larger or smaller wheel as desired. A gear wheel N obtains bearing in the end A and is constructed to receive the end of the stirrer shaft not shown and is adapted to mesh with the pinion L by means of which motion is transmitted to the stirrer shaft for effecting a discharge of the grain or fertilizer in the usual manner. This curved casting K has a suitable bearing in the hanger E by means of which it is guided in its movements and a pinion O is suitably disposed to mesh with the teeth $k$ and with the teeth $i$ of the lever I so that on operating the latter the said casting K will be moved in its bearings for the purpose herein specified. The hanger E and the gearing carried thereby as well as the gear wheel M are protected by suitable housing P.

When it is desired to change the gearing L and M, either or both, the lever I is operated to project the lower end of the casting K beyond the lower end of the housing P so that the said gearing is exposed and readily accessible to be replaced by other gearing of larger or smaller diameter as required. After the change has been effected the lever I is again operated to withdraw the casting and bring the gearing L and M respectively in mesh with the gear wheels D and N as hereinbefore set forth.

Having thus described my invention, what I claim, and desire to secure by Letters Patent, is—

In a grain and fertilizer drill the combination of the hopper end having an arm, a lever G mounted on the said arm, a second lever H having engagement at its upper end with the lever G, and having its lower end slotted, a hanger E having a tubular extension to project through the upper end and enter the slot in the lower end of the lever H, a spring $h$ confined between the said tubular extension and the inner slotted ends of the said lever H, a toothed lever I mounted on the tubular extension of the hanger and provided with a pawl to engage with a ratchet portion of the said hanger, a casting K having teeth $k$, a pinion to mesh with the said toothed lever I and the teeth $k$ of the said casting K the gear wheels D and N, housing P protecting the operating parts, and interchangeable gearing L and M carried by the said casting K and adapted to mesh with the gear wheels D and N, substantially as and for the purpose set forth.

In testimony whereof I affix my signature in presence of two witnesses.

TRUMAN A. HILL.

Witnesses:
SAML. L. ROCKFELLOW,
C. P. OLP.